(12) United States Patent
Maiolani et al.

(10) Patent No.: US 10,235,883 B2
(45) Date of Patent: Mar. 19, 2019

(54) CYCLING SAFETY SYSTEM

(71) Applicants: FREESCALE SEMICONDUCTOR, INC., Austin, TX (US); Mark Maiolani, East Kilbride (GB); Ross McLuckie, East Kilbride (GB); Graham Daniel Troy, Hamilton (GB)

(72) Inventors: Mark Maiolani, East Kilbride (GB); Ross McLuckie, East Kilbride (GB); Graham Daniel Troy, Hamilton (GB)

(73) Assignee: NXP USA, INC., Austin, TX (US)

(*) Notice: Subject to any disclaimer, the term of this patent is extended or adjusted under 35 U.S.C. 154(b) by 0 days.

(21) Appl. No.: 14/787,003

(22) PCT Filed: Apr. 30, 2013

(86) PCT No.: PCT/IB2013/053406
§ 371 (c)(1),
(2) Date: Oct. 26, 2015

(87) PCT Pub. No.: WO2014/177908
PCT Pub. Date: Nov. 6, 2014

(65) Prior Publication Data
US 2016/0104380 A1    Apr. 14, 2016

(51) Int. Cl.
*G08G 1/16* (2006.01)
*G01S 19/13* (2010.01)
(Continued)

(52) U.S. Cl.
CPC .............. *G08G 1/166* (2013.01); *B62J 3/00* (2013.01); *B62J 6/001* (2013.01); *B62J 6/04* (2013.01);
(Continued)

(58) Field of Classification Search
CPC .. B60Q 1/525; B60Q 1/24; B62J 6/003; B62J 11/00; B62J 99/00; G08G 1/61
See application file for complete search history.

(56) References Cited

U.S. PATENT DOCUMENTS 6,060,982 A * 5/2000 Holtrop ................. B62J 11/00
                                                    340/427
6,731,202 B1 * 5/2004 Klaus .................... B60Q 1/525
                                                    340/425.5
(Continued)

FOREIGN PATENT DOCUMENTS

GB        2530621 A  *  3/2016  ............. B62J 99/00
JP        2009116882      5/2009
JP        2011106978      6/2011

OTHER PUBLICATIONS

International Search Report and Written Opinion correlating to PCT/IB2013/053406 dated Jan. 9, 2014.
(Continued)

*Primary Examiner* — Daniell L Negron (57) ABSTRACT

A safety system comprising:
a safety apparatus adapted to be mounted at the rear of a bicycle and comprising a processor, a motion sensor, a threat sensing device and a user alert device, all coupled to the processor,
wherein the processor is adapted to:
control the driver alert device based on a threat position value and/or the threat speed value;
control the user alert device based on at least one of a motion-based value, an ambient light-based value, the threat position value and the threat speed value.
It is also claimed the safety apparatus and a collaborative safety system comprising a plurality of safety systems, each being coupled to a communication device through which the processor is further adapted to control the driver alert device
(Continued)

and/or the user alert device of the others of the plurality in response to the sensing of a threat.

20 Claims, 3 Drawing Sheets (51) Int. Cl.
*B62J 6/00* (2006.01)
*B62J 6/04* (2006.01)
*B62J 3/00* (2006.01)
*B62J 99/00* (2009.01)

(52) U.S. Cl.
CPC ............... *B62J 99/00* (2013.01); *G01S 19/13* (2013.01); *B62J 2099/002* (2013.01); *B62J 2099/004* (2013.01); *B62J 2099/0013* (2013.01)

(56) References Cited

U.S. PATENT DOCUMENTS

| | | | | |
|---|---|---|---|---|
| 7,079,024 B2* | 7/2006 | Alarcon | ................ | G08G 1/161 340/539.11 |
| 7,362,241 B2* | 4/2008 | Kubota | .................. | B60Q 1/24 340/435 |
| 7,812,740 B2* | 10/2010 | Mergen | ................. | B60Q 5/008 340/436 |
| 2004/0189722 A1* | 9/2004 | Acres | ....................... | B62J 6/003 715/866 |
| 2004/0263330 A1* | 12/2004 | Alarcon | ................. | G08G 1/161 340/539.23 |
| 2009/0085770 A1* | 4/2009 | Mergen | .................. | B60Q 5/008 340/904 |
| 2010/0194130 A1* | 8/2010 | Bartolome Garcia | ... | B62J 11/00 296/1.07 |
| 2011/0046920 A1* | 2/2011 | Amis | ..................... | G01S 19/16 702/181 |
| 2011/0084822 A1* | 4/2011 | Li | ............................ | B62J 99/00 340/432 |
| 2011/0304478 A1* | 12/2011 | Lee | ....................... | B60Q 9/008 340/933 |
| 2012/0065858 A1* | 3/2012 | Nickolaou | ............. | G08G 1/162 701/70 |
| 2012/0104278 A1* | 5/2012 | Downing | ........... | G01N 21/6428 250/458.1 |

OTHER PUBLICATIONS

Internet Website : http://www.nsinnovations.com.au/blog/2012/08/firefly-protects-cyclists-busy-roads—Firefly protects cyclists on busy roads (Aug. 9, 2012).
Internet Website : http://www.lightlanebike.com/about.html—Lightlane.
Internet Website : http://www.gizmag.com/mit-copenhagen-electric-bicycle-wheel-hub/13626/—Copenhagen wheel.

* cited by examiner

CYCLING SAFETY SYSTEM

FIELD OF THE INVENTION

This invention relates to a cycling safety apparatus, a cycling safety system and a collaborative cycling safety system.

BACKGROUND OF THE INVENTION

Almost everyone owns a bicycle and bicycle riding for both recreation and transportation enjoys increasing popularity. However, among the whole traffic accidents, the rate of car to bicycle accidents is gradually increasing.

Indeed, bicycle collision with a vehicle or another bicycle is one of the major causes of bicycles accidents. This is mainly due to the fact that a cyclist riding on the roadway is unaware of traffic approaching from behind or is uncertain if the traffic is passing safely.

There are known safety systems which alert bicycle users about a potential threat. For example, document U.S. Pat. No. 6,731,202 discloses a bicycle-mounted vehicle proximity warning device that warns a cyclist that a vehicle is approaching from rear. In this document, the warning device also includes a vehicle alert circuit that can activate a bright flashing light at the rate of between three to five hertz, at the approaching vehicle for the purpose of alerting its driver of the cyclist proximity.

However, another major cause of bicycle accident, which is for instance the cyclist' loss of control of its bicycle, is not properly considered in such document.

SUMMARY OF THE INVENTION

The present invention provides a safety apparatus, a safety system and a collaborative safety system as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the proposed solution may for the most part, be implemented using electronic devices and circuits known to those skilled in the art, details will not be explained in any greater extent than that considered necessary for the understanding and appreciation of the underlying concepts of the present invention, in order not to obfuscate or distract from the teachings of the present invention.

One of the two major causes of bicycle accidents is from cyclist' loss of control of its bicycle. This can happen from several different factors such as difficulty when braking, riding a bike on the wrong size, riding too fast, riding double, doing tricks, foot slippage, hitting an object, bump, obstacle or pot hole, and also riding on slippery surfaces. This loss of control of the bicycle may surprise the driver of an oncoming vehicle or another bicycle approaching the cyclist losing control of its bicycle and therefore may provoke a collision.

By the apparatus proposed herein, an effective safety mechanism may be achieved by considering, at least, both the two major causes of bicycle accidents, i.e. cyclist' loss of control of its bicycle and bicycle collision with a vehicle or another bicycle.

Figure 1:
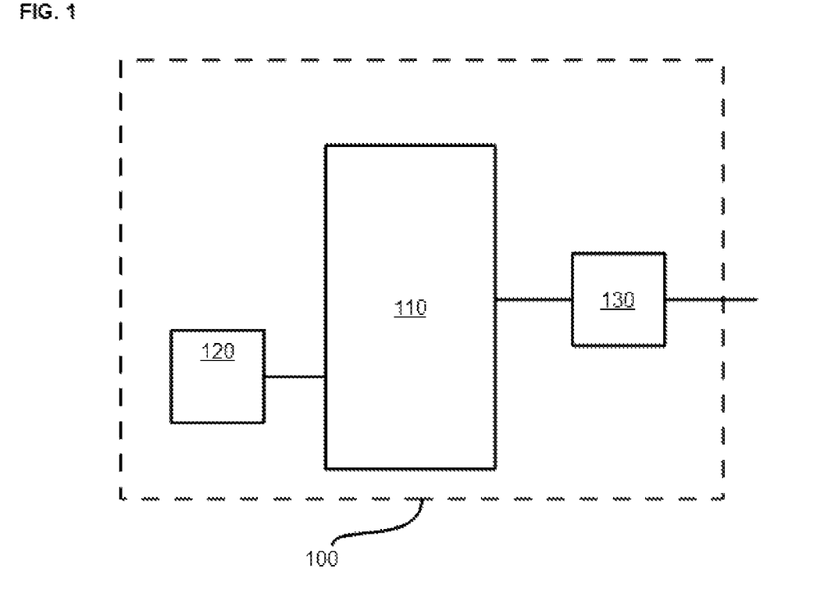
FIG. 1 is a schematic block diagram of an embodiment of a safety apparatus.

Referring to FIG. 1, there is diagrammatically shown therein an exemplary safety apparatus 100. The safety apparatus 100 is adapted to be mounted for example on a bicycle with two or more wheels. The safety apparatus 100 as shown comprises:

a processing resource, for example a processor 110 or any other similar processing apparatus, such as e.g. a microcontroller;

one or more motion sensors 120, for example acceleration sensors or yaw sensors; and, an alert device, for example a driver alert device 130.

In examples of embodiments, both the motion sensor 120 and the driver alert device 130 may be implemented as hardware, software or any combination thereof, for instance.

In the example of FIG. 1, the motion sensor 120 is operably coupled to the processor 110 and is adapted to:

determine an acceleration of the safety apparatus 100 when the bicycle is in motion such as a change in travelling direction or the lean angle of the safety apparatus; and, generate a motion-based value representative of the acceleration.

It is therefore possible to determine the rate of change in motion of the safety apparatus 100 being mounted on a bicycle, the latter being in motion. Correlatively, the rate of change in motion of the bicycle may be determined as well. The determination may be performed by the processor 110, for instance. In this example, the motion sensor 120 may be mounted on the bicycle, for example on the handlebar, under the saddle or on the frame of the bicycle. However, it will be appreciated that other locations on the bicycle may be chosen as well.

Referring back to FIG. 1, the driver alert device 130 is operably coupled to the processor 110 and the processor is adapted to cause the driver alert device 130 to output a first alert signal perceivable at least by a driver of an oncoming vehicle, or another bicycle, approaching the bicycle. Therefore, it is to be understood that the driver alert device 130 is configured to output the first alert signal in a way to attract the attention and/or keep the awareness of the driver of the oncoming vehicle, or another bicycle different from the user of the bicycle carrying the safety apparatus 100.

For example, in one embodiment, the driver alert device 130 may be a laser projection device and the processor 110 may be further adapted to cause the driver alert device 130 to project the first alert signal on the ground. This could be the case, for example, when the safety apparatus 100 is mounted at the rear of the bicycle.

Also, in another embodiment, the driver alert device 130 may be a LED flashing device and the processor 110 may be further adapted to cause the driver alert device 130 to flash the first alert signal towards the driver of for example on oncoming vehicle.

Possibly, in yet another embodiment, the driver alert device 130 may be wirelessly coupled to the processor 110 and may be further adapted to be mounted on a cycling clothing or apparel of the user such as a helmet, the cycling clothing or apparel of the user being adapted to be worn by a user of the bicycle.

Referring back to FIG. 1, the processor 110 is adapted to control the driver alert device 130 with respect to the motion-based value. This feature would help getting the awareness of the driver of the oncoming vehicle or another bicycle approaching the bicycle in a dangerous way.

Possibly, in one embodiment, the processor 110 may be further adapted to cause the first alert device to output the first alert signal when the motion-based value is greater than a predefined acceleration value. In an example, the first alert signal may be outputted when the motion-based value is greater than a predefined backward acceleration value with respect to the direction of motion of the safety apparatus. Therefore, where the bicycle carrying the safety apparatus 100 is experiencing a backward acceleration (e.g. hitting an object) or a forward acceleration (e.g. braking), the processor 110 is able to control the driver alert device 130 in outputting the first alert signal and also in the way the first alert signal should be outputted. For example, the processor 110 may control the driver alert device 130 to flash intermittently the first alert signal for periods of a given duration. In another example, the first alert signal may be outputted when the motion-based value is greater than a predefined lateral acceleration value with respect to the direction of motion of the safety apparatus. Therefore, when the bicycle carrying the safety apparatus 100 is experiencing a lateral acceleration (e.g. turning right or left), the processor 110 is able to control the driver alert device 130 in outputting the first alert signal and also in the way the first alert signal should be outputted. For example, the processor 110 may control the driver alert device 130 to flash the first alert signal in a way indicating that the bicycle is turning right or left. Hence, where the driver alert device 130 is a LED flashing device, only part of the LEDs on the right or the left part with respect to the user may be activated, for instance. In yet another example, the first alert signal may be outputted when the motion-based value is greater than a predefined footward or headward acceleration value with respect to the direction of motion of the safety apparatus. Therefore, when the bicycle carrying the safety apparatus 100 is experiencing a footward acceleration (e.g. hitting a bump) or headward acceleration (e.g. hitting a pot hole), the processor 110 is able to control the driver alert device 130 in outputting the first alert signal. As explained above, a particular visual scheme may utilised by the driver alert device 130 to indicates such events to the driver of the oncoming vehicle approaching the bicycle carrying the safety apparatus 100.

In another embodiment the safety apparatus 100 may further comprise an ambient light sensor which may be coupled to the processor 110. In this example, the ambient light sensor may be adapted to determine an ambient light level in the vicinity of the safety apparatus 100 when the bicycle is in motion; and, generate an ambient light value representative of the ambient light level.

In that embodiment, the processor 110 may further be adapted to control the driver alert device 130 with respect to the ambient light value. This feature would help getting adjusting the intensity of the first alert signal in order to get or keep the awareness of the driver of the oncoming vehicle or another bicycle. For example, the processor may increase or decrease the light intensity of the first alert signal in a different manner during daytime or night-time.

Figure 2:
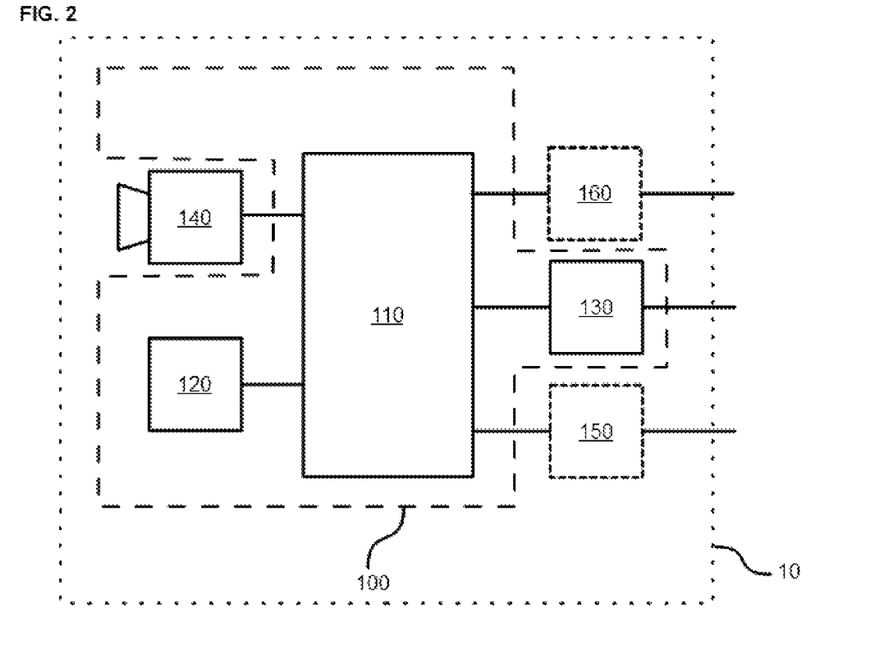
FIG. 2 is a schematic block diagram of an embodiment of a safety system.

Referring now to FIG. 2, there is diagrammatically shown therein an exemplary safety system 1000. The safety system 1000 as shown comprises:

the safety apparatus 100 of FIG. 1; and, a threat sensing device 140, coupled to the processor 110 of the safety apparatus 100 and adapted to:

sense a threat within the vicinity of the safety apparatus 100, such as an oncoming vehicle approaching the bicycle, when the bicycle is in motion; and, generate a threat position value and/or a threat speed value associated with the threat with respect to the safety apparatus 100.

In examples of embodiments, the threat sensing device 140 may be implemented as hardware, software or any combination thereof, for instance. Additionally, the threat sensing device 140 may be based on radar, ultrasound or Lidar (Laser-radar) technologies or any combination thereof, for instance. With radar technology, for example, the speed and the angle of the threat may be precisely determined.

Referring back to FIG. 2, the processor 110 is further adapted to control the driver alert device 130 with respect to the threat position value and/or the threat speed value. This feature would help getting or keeping the awareness of the driver of the oncoming vehicle or another bicycle depending on its position and/or its speed with respect to the bicycle carrying the safety system 10. Therefore, it is to be understood that the driver alert device 130 may be triggered if an oncoming vehicle or another bicycle is getting too close to the bicycle and/or at a fast pace towards the bicycle carrying the safety system 10. However, for example, the threat position value may be defined in such a way that when the bicycle is turning (i.e. lateral acceleration) an angle information associated with the oncoming vehicle and derived from a combination of the predefined lateral acceleration value and the threat position value can be used to project the path of the oncoming driver in order to determine whether the threat is really a threat or not. Therefore, only "real" threats may be detected while "false" threats would be discarded. In fact, for example, a "real" threat that is detected where the threat sensing device 140 is at a horizontal position may be a "false" threat where the threat sensing device 140 is; for instance, at the angle of thirty to forty-five degrees. This feature would help avoiding triggering false alerts, thus reducing power consumption and also improving the signalling to the oncoming driver.

In one embodiment, the safety system 10 may further comprise a user alert device 150 coupled to the safety apparatus 100 and adapted to output a second alert signal being perceivable at least by a user of the bicycle. This feature would help getting or keeping the awareness of the user of the bicycle about an oncoming vehicle or another bicycle in its vicinity. For example, the second alert signal may be a visual signal or an audible signal.

In the example of FIG. 2, the processor 110 is further adapted to control the user alert device 150 with respect to at least one of the motion-based value, the ambient light-based value, the threat position value and the threat speed value.

In examples of embodiments, the user alert device 150 may be implemented as hardware, software or any combination thereof, for instance. For example, in one embodiment, the user alert device 150 may be adapted to be wirelessly coupled to the processor 110 and may be further adapted to be integrated into a portable device such as a smartphone or a tablet. Hence, in an embodiment, if the user is listening to an audible signal such as music or a podcast on his portable device while cycling, the processor 110 may be further adapted to alter at least one characteristic of the audible signal such as the volume of such audible signal in a way to get or keep the user awareness about a potential threat. For example, the volume of the audible signal may be set to mute mode or decreased below a predefined volume value. In another example, a predefined audible alert message may replace the current audible sound being listened to by the user in such event.

In another embodiment the safety system 10 may further comprise a GPS sensor 160 which may be coupled to the processor 110 of the safety apparatus 100. In this example, the GPS sensor 160 may be adapted to determine a geographical position of the safety system 10 when the bicycle is in motion; and, generate a geographical position value representative of the geographical position.

In that embodiment, the processor 110 may further be adapted to control the user alert device 130 with respect to the geographical position value. This feature would help monitoring the position and/or the speed of the bicycle carrying the safety system 10. For example, let's consider that the speed of the bicycle carrying the safety system 10 is monitored every five to ten seconds. Then, let's imagine that based on the monitored data, the processor 110 for example determine that there has been a sudden stop (e.g. a fast deceleration) of the bicycle. This could be done, for example, by comparing the pace of the bicycle at the given period and if the speed of the bicycle suddenly drops within two or three periods, such event may be detected. Therefore, it may be deduced that the bicycle may have had an accident, especially if an alert was raised on the safety system 10 for example due to an oncoming vehicle present in the vicinity of the bicycle and/or data from the motion sensor 120 indicates that the bicycle is lying on its side and/or if the speed of the bicycle had not increase after a predetermined period after the sudden stop. In that example, an emergency message may be sent to emergency services and/or to family relatives, so further action may be taken. The emergency message may be a text or an audio message, for instance. However, it would be appreciated that others actions may be taken when such event is detected.

Figure 3:
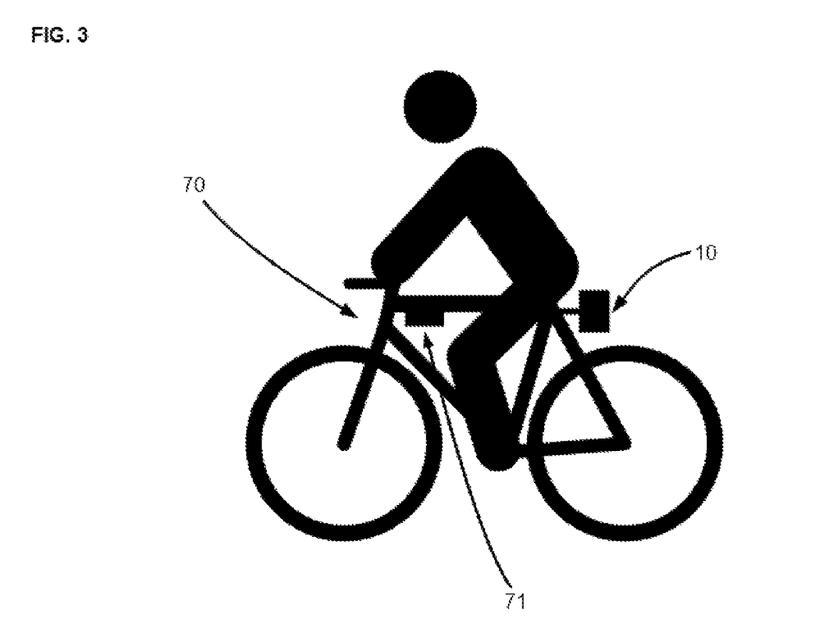
FIG. 3 is a schematic diagram of an electrical bicycle comprising the safety system of FIG. 2.

In an alternative embodiment, referring to FIG. 3, the bicycle may be an electrical bicycle (i.e. e-bike) 70 comprising a battery 71 adapted to supply in power a drive unit adapted to drive the e-bike and further to supply in power at least the driver alert device 130 comprised in the safety system 10. Additionally, the battery 700 may also supply in power the user alert device 150 comprised in the safety system 10.

Figure 4:
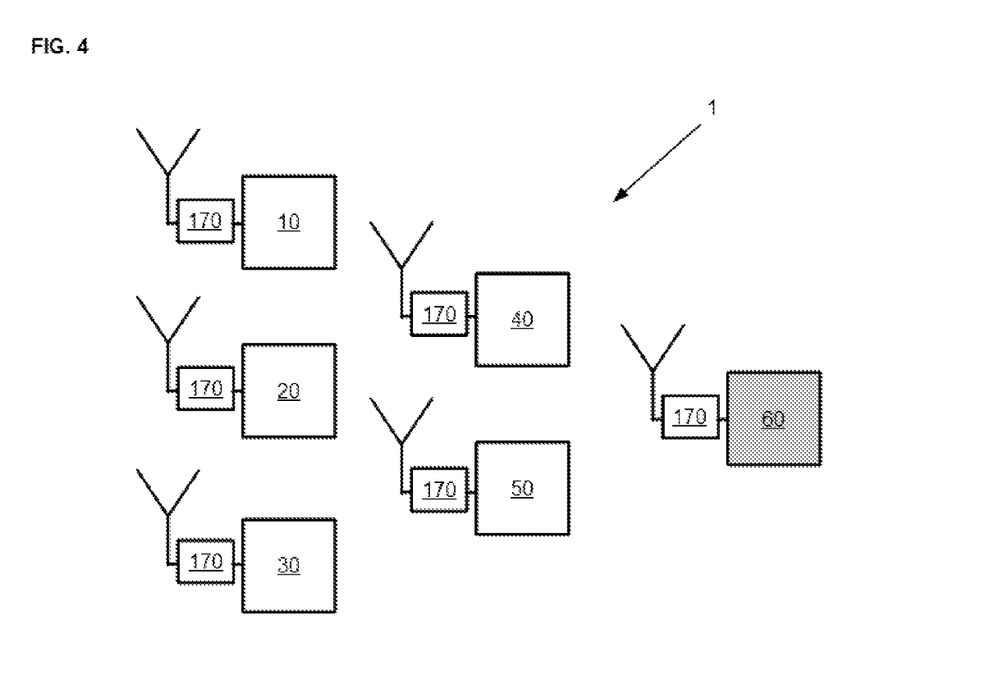
FIG. 4 is a schematic block diagram of an embodiment of a collaborative safety system.

Referring now to FIG. 4, there is diagrammatically shown therein an exemplary collaborative safety system 1. The collaborative safety system 1 as shown comprises a plurality of safety systems of FIG. 2 wherein each of the plurality of safety system 10, 20, 30, 40, 50, 60 further comprise a communication device 170 coupled to the processor of the safety system 10, 20, 30, 40, 50, 60. In this example, the communication device 170 of each one of the plurality of safety systems of FIG. 2 is adapted to enable wireless communication with at least another one of the plurality of safety systems 10, 20, 30, 40, 50, 60. Also, the processor 110 of each one of the plurality of safety systems 10, 20, 30, 40, 50, 60 is further adapted to control through the corresponding communication device 170, the driver alert device 130 and/or the user alert device 150 of the other safety systems 10, 20, 30, 40, 50, 60 in response to the sensing of a threat with the corresponding threat sensing device 140.

The communication device 170 may be based on short range wireless technologies such as Bluetooth, Zigbee or Wifi. With Bluetooth, for example, peer-to-peer connection may be established between each of the plurality of safety systems 10, 20, 30, 40, 50, 60.

Figure 5:
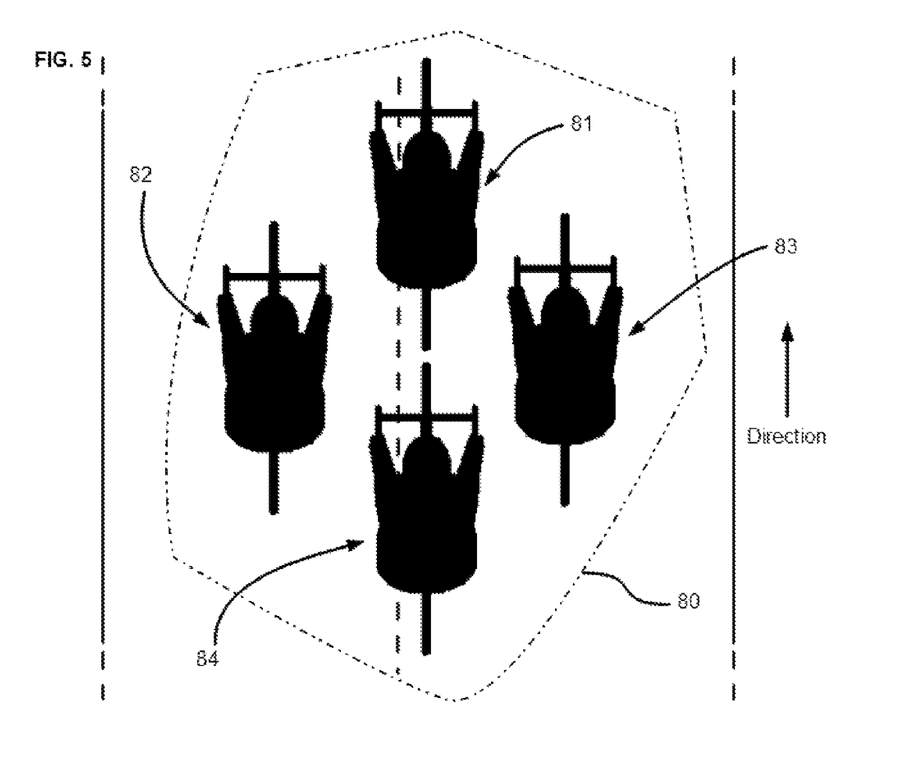
FIG. 5 is a top view schematic diagram of a group of bicycles carrying the safety system of FIG. 2.

Possibly, in the previous embodiment, the threat sensing device 140 of at least one safety system 10, 20, 30, 40, 50, 60 is activated out of the plurality of safety systems 10, 20, 30, 40, 50, 60. This feature would help reducing the overall power consumption of the plurality of safety systems 10, 20, 30, 40, 50, 60. For example, referring to FIG. 5, let's consider a group of users 81, 82, 83, 84 such as those than can be seen in road bicycle race. In this example, each user is riding a bicycle carrying the safety system 10 of FIG. 2. In that embodiment, the user 84 which is at the rear of the peloton 80 may be the only one of the peloton 80 to activate its threat sensing device 140. This way, the threat information is passed between the safety systems 10, 20, 30, 40, 50, 60 of the plurality and the threat sensing device 140 of the others users 81, 82, 83 of the peloton 80 may be deactivated, thus reducing the overall power consumption of the peloton 80.

Possibly, in the previous embodiment, the safety system 10, 20, 30, 40, 50, 60 comprising the activated threat sensing device 140 is selected out of the plurality of safety systems, based on the determination of the location of the selected safety system 10, 20, 30, 40, 50, 60 with respect to the other safety systems 10, 20, 30, 40, 50, 60 by triangulating the wireless signals generated by each corresponding communication devices 170. For example, part or all processors 110 of the plurality of safety systems may be used to perform such determination. For example, a master processor may be used to coordinate the calculation made by the others processors. In one embodiment, the one or more selected safety systems of which the threat sensing device 140 may be activated, may be manually determined in advance, prior the race and the formation of the peloton, for instance. In this example, the plurality of safety systems 10, 20, 30, 40, 50, 60 may comprise some safety systems 10, 20, 30, 40, 50, 60 that may be in accordance with the safety apparatus of FIG. 2 and some safety systems 10, 20, 30, 40, 50, 60 that may be in accordance with the safety apparatus of FIG. 1, wherein no threat sensing device 140 is present. Therefore, referring to FIG. 5, the peloton 80 may comprise only one bicycle carrying a safety system 10, 20, 30, 40, 50, 60 comprising a threat sensing device 14, for instance.

The skilled person would appreciate that the proposed solution may be embodied in an electronic system that improves bicycle safety for both the user of the bicycle and also the driver of an oncoming vehicle approaching the bicycle, for example. The electronic system may be attached to the bicycle in the same sort of way the lights are attached on the back of a bicycle. This helps detecting hidden traffic coming from the back of the bicycle and approaching in a dangerous way. Additionally, one should appreciate that the signalling of for example with driver alert device and/or the user alert device is performed in an adaptive way. Namely, the signalling may be dynamically modulated, for example, based on the speed and/or the position and/or angle of arrival of the driver, the acceleration and/or the geographical position of the user and/or the ambient light to which the user and/or the user are exposed.

Of course, the above advantages are exemplary, and these or other advantages may be achieved by the proposed solution. Further, the skilled person will appreciate that not all advantages stated above are necessarily achieved by embodiments described herein.

The proposed solution may also be implemented in a computer program product stored in a non-transitory computer-readable storage medium that stores computer-executable code which causes a processor computer to perform the operation of the processor, the user alert device and the driver alert device, for instance. For example, the feature directed to the GPS sensor may be embodied in a program product.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory u n its such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for example include at least one processing unit, associated memory and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. For example, the user alert device and the driver alert may be combined in a single module. Also, one or more sensors may be combined in a single module.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermedial devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:
1. A safety apparatus adapted to be mounted on a first bicycle, the apparatus comprising:
  a processor;
  one or more motion sensors, coupled to the processor;
  a driver alert device coupled to the processor, wherein the motion sensor is adapted to
    determine an acceleration of the safety apparatus when the first bicycle is in motion, and
    generate a motion-based value representative of the acceleration;
  the processor is adapted to, with respect to the motion-based value, cause the driver alert device to output a first alert signal perceivable by a driver of an oncoming vehicle approaching the first bicycle; and
  a communication device coupled to the processor, the processor to communicate with a second driver alert device of a second safety apparatus mounted on a second bicycle via the communication device, the processor, with respect to the motion-based value, to cause the second driver alert device mounted on the second bicycle to output a second alert signal perceivable at least by a driver of an oncoming vehicle approaching the first bicycle.

2. The safety apparatus of claim 1 wherein the driver alert device further comprises: a laser projection device, wherein and the processor is further adapted to cause the driver alert device to project the first alert signal on the ground using the laser projection device.

3. The safety apparatus of any one of claim 1, wherein the driver alert device further comprises a LED flashing device and the processor is further adapted to cause the driver alert device to flash the first alert signal using the LED flashing device.

4. The safety apparatus of claim 1, wherein the processor is wirelessly coupled to the driver alert device.

5. The safety apparatus of any one of claim 1 wherein the processor is adapted to cause the driver alert device to output the first alert signal when the motion-based value is greater than a predefined acceleration value.

6. The safety apparatus of claim 5 wherein the predefined acceleration value is a predefined backward, forward, lateral, footward or headward acceleration value with respect to the direction of motion of the safety apparatus.

7. The safety apparatus of claim 1 further comprising an ambient light sensor, coupled to the processor, the ambient light sensor adapted to
  determine an ambient light level in the vicinity of the safety apparatus when the bicycle is in motion; and,
  generate an ambient light value representative of the ambient light level, wherein
  the processor is further adapted to control the driver alert device with respect to the ambient light value.

8. A safety system comprising:
  a safety apparatus according to claim 1 adapted to be mounted at the rear of a bicycle; and
  a threat sensing device, coupled to the processor of the safety apparatus, adapted to:
    sense a threat within the vicinity of the apparatus when the bicycle is in motion, and
    generate, with respect to the apparatus, one or more of a threat position value and a threat speed value associated with the threat,
  wherein the processor is further adapted to control the driver alert device with respect to one or more of the threat position value and the threat speed value.

9. The safety system of claim 8 further comprising: a user alert device, wherein:
  the user alert device is coupled to the safety apparatus and is adapted to output a third alert signal perceivable at least by a user of the bicycle; and
  the processor is further adapted to control the user alert device with respect to at least one of the motion-based value, the ambient light value, the threat position value and the threat speed value.

10. The safety system of claim 9 wherein the user alert device is adapted to be wirelessly coupled to the processor and is further adapted to be integrated into a portable device such as a smartphone or a tablet.

11. The safety system of claim 9, wherein:
  the third alert signal is an audible signal; and
  the processor is further adapted to alter at least one characteristic of the audible signal such as the volume that may be muted or decreased below a predefined volume value.

12. The safety system of claim 8, further comprising a GPS sensor, coupled to the processor, and
  the GPS sensor is adapted to
    determine a geographical position of the safety apparatus when the bicycle is in motion; and
    generate a geographical position value representative of the geographical position of the safety apparatus, wherein
  the processor is further adapted to control the driver alert device with respect to the geographical position value.

13. The safety system of claim 8 wherein the bicycle is an electrical bicycle comprising a battery adapted to supply in power a drive unit adapted to drive the electrical bicycle and further to supply in power at least the driver alert device.

14. A collaborative safety system comprising: a plurality of safety systems according to claim 8, wherein the processor is further adapted to control one or more of the driver alert device and the user alert device of the other safety systems in response to the sensing of a threat by the threat sensing device.

15. The collaborative safety system of claim 14 wherein the threat sensing device of at least one safety system is activated out of the plurality of safety systems.

16. The collaborative safety system of claim 15 wherein the safety system comprising the activated threat sensing device is selected out of the plurality of safety systems, based on the location of the selected safety system with respect to the other safety systems by triangulating the wireless signals generated by each corresponding communication devices.

17. A safety system comprising:
  a safety apparatus adapted to be mounted on a first bicycle, the safety apparatus comprising:
    a processor;
    one or more motion sensors, coupled to the processor; and
    a driver alert device coupled to the processor, wherein the motion sensor is adapted to
      determine an acceleration of the safety apparatus when the first bicycle is in motion, and
      generate a motion-based value representative of the acceleration; and
    the processor is adapted to, with respect to the motion-based value, cause the driver alert device to output a first alert signal perceivable at least by a driver of an oncoming vehicle approaching the first bicycle; and a user alert device coupled to the safety apparatus, the user alert device is adapted to stop providing a current audible sound and to provide a second alert signal perceivable by a user of the bicycle in place of the current audible sound in response to a threat position value and a threat speed value; and a communication device coupled to the processor, the processor to communicate with a second driver alert device of a second safety apparatus mounted on a second bicycle via the communication device, the processor, with respect to the motion-based value, to cause the second driver alert device mounted on the second bicycle to output a second alert signal perceivable at least by a driver of an oncoming vehicle approaching the first bicycle.

18. The safety apparatus of claim 17 wherein the driver alert device further comprises: a laser projection device, wherein and the processor is further adapted to cause the driver alert device to project the first alert signal on the ground using the laser projection device.

19. The safety apparatus of claim 17, wherein the driver alert device further comprises a LED flashing device and the processor is further adapted to cause the driver alert device to flash the first alert signal using the LED flashing device.

20. The safety apparatus claim 17 wherein the processor is adapted to cause the driver alert device to output the first alert signal when the motion-based value is greater than a predefined acceleration value.

* * * * *